(12) United States Patent
Keany (10) Patent No.: US 7,591,089 B2
(45) Date of Patent: Sep. 22, 2009

(54) BOOM ASSEMBLY

(75) Inventor: Bart Keany, London (GB)

(73) Assignee: Cole Technology Limited, Middlesex (GB)

( * ) Notice: Subject to any disclaimer, the term of this patent is extended or adjusted under 35 U.S.C. 154(b) by 152 days.

(21) Appl. No.: 11/661,520

(22) PCT Filed: Aug. 26, 2005

(86) PCT No.: PCT/EP2005/054221

§ 371 (c)(1),
(2), (4) Date: Apr. 2, 2007

(87) PCT Pub. No.: WO2006/021585

PCT Pub. Date: Mar. 2, 2006

(65) Prior Publication Data

US 2008/0016728 A1    Jan. 24, 2008

(30) Foreign Application Priority Data

Aug. 27, 2004 (GB) .................................. 0419248

(51) Int. Cl.
*E02F 3/96* (2006.01)

(52) U.S. Cl. .............................. 37/408; 37/468; 37/403; 414/694; 414/695.8

(58) Field of Classification Search ........... 37/408–410, 37/468, 403; 414/722, 723, 694, 695.8
See application file for complete search history.

(56) References Cited

U.S. PATENT DOCUMENTS

| | | | | |
|---|---|---|---|---|
| 2,910,274 A | * | 10/1959 | Scott ........................... | 175/103 |
| 3,463,336 A | * | 8/1969 | Mork .......................... | 414/694 |
| 3,517,960 A | * | 6/1970 | Mork et al. ................... | 37/461 |
| 3,871,538 A | * | 3/1975 | Miller et al. ................. | 414/718 |
| 3,881,263 A | * | 5/1975 | Coeurderoy .................. | 37/186 |
| 4,257,731 A | * | 3/1981 | Beaver ........................ | 414/694 |
| 4,274,796 A | * | 6/1981 | Phillips ...................... | 414/690 |
| 4,274,797 A | | 6/1981 | Coon | |
| 4,313,367 A | * | 2/1982 | Weyer ........................... | 92/33 |
| 4,393,607 A | | 7/1983 | Hirosawa | |

(Continued)

FOREIGN PATENT DOCUMENTS

EP    0268334    5/1988

(Continued)

OTHER PUBLICATIONS

International Search Report for PCT/EP2005/054221, dated Apr. 24, 2006.

(Continued)

*Primary Examiner*—Thomas A Beach
(74) *Attorney, Agent, or Firm*—Wolf, Greenfield & Sacks, P.C.

(57) ABSTRACT

A boom assembly comprises a primary boom member having one end attachable to a vehicle and a secondary boom member pivotally attached to the free end of the primary boom member for rotation of the secondary boom member about a first axis relative to the primary boom member. The secondary boom member includes a swivel mechanism configured to enable the secondary boom member to rotate relative to the primary boom member about a second axis of rotation independently to rotation of the secondary boom member relative to the primary boom member about the first axis of rotation.

19 Claims, 6 Drawing Sheets

U.S. PATENT DOCUMENTS

| | | | |
|---|---|---|---|
| 4,542,940 A | * 9/1985 | Marten | 299/1.5 |
| 4,797,060 A | * 1/1989 | Kishi et al. | 414/687 |
| 4,889,466 A | * 12/1989 | Jindai et al. | 414/694 |
| 4,950,127 A | * 8/1990 | Weyer | 414/694 |
| 4,952,116 A | * 8/1990 | Weyer | 414/694 |
| 5,054,990 A | * 10/1991 | Schaeff | 414/694 |
| 5,071,310 A | 12/1991 | Weyer | |
| 5,158,420 A | 10/1992 | Weyer | |
| 5,267,504 A | * 12/1993 | Weyer | 92/31 |
| 5,327,812 A | * 7/1994 | Weyer et al. | 92/144 |
| 5,404,660 A | * 4/1995 | Webster | 37/189 |
| 6,370,801 B1 | * 4/2002 | Weyer et al. | 37/406 |

FOREIGN PATENT DOCUMENTS

| | | |
|---|---|---|
| EP | 0 414 660 A1 | 2/1991 |
| FR | 2 629 114 | 9/1989 |
| GB | 2 071 182 A | 9/1981 |
| JP | 11-117342 | 4/1999 |
| JP | 2004-182391 | 7/2004 |
| WO | WO 9208850 A2 * | 5/1992 |
| WO | WO 92/20875 | 11/1992 |

OTHER PUBLICATIONS

International Search Report for United Kingdom Application GB 0419248 (2 pages).

* cited by examiner

BOOM ASSEMBLY

RELATED CASE INFORMATION

This application is a 371 US National Stage Application of International Application No. PCT/EP2005/054221, filed on Aug. 26, 2005, claiming priority to British application No. 0419248.0, filed on Aug. 27, 2004, the entire disclosures of which are incorporated herein by reference.

The present invention relates to a boom assembly and, more specifically, to a boom assembly having one end that is intended to be mounted to a vehicle such as a bulldozer, tunnelling machine or other heavy plant machinery or appliance for driving the boom to enable a device mounted to the free end of the boom to be used for carrying out various construction or building related tasks such as excavating, drilling, tunnelling, cleaning or tunnel segment placement and assembly.

Vehicles, such as earth moving or excavating machines, are commonly used in the construction and building industries and are often equipped with articulated boom assemblies. The free end of the boom may commonly be fitted with a selected one of a number of different attachments or devices depending on the task to be performed. For example, the boom assembly may be fitted with a bucket for excavating and/or moving materials such as earth or sand or, a drill or cutting head for tunnelling purposes. To enable the attachment to be moved to a desired location in the vicinity of the vehicle to which it is attached, the boom assembly usually includes a primary boom member having one end that is pivotally attached to the vehicle using a universal coupling or joint for rotation of the whole boom assembly in both vertical and horizontal directions. A secondary boom member is pivotally attached to the free end of the primary boom member so that the angle formed between the primary and secondary boom members can be altered by pivoting the secondary boom member with respect to the primary boom member about a single axis of rotation to move the device mounted on the free end of the secondary boom element towards or away from the vehicle. The bucket or other attachment may also be pivotally mounted to the free end of the secondary boom to enable it to be manipulated independently from the boom assembly to which it is attached.

Movement of the primary boom element relative to the vehicle, movement of the secondary boom element relative to the primary boom element and movement of the device relative to the secondary boom element is controlled using hydraulic cylinders mounted to the boom assembly and controlled via hydraulic systems attached to the vehicle and connected to the cylinders via hoses.

A disadvantage with conventional boom assemblies is that they have a limited range of movement. This is particularly noticeable when the boom is being used in a confined space such as in the construction or cleaning of tunnels where a conventional boom assembly does not have the required degree of flexibility to enable it to be used in all situations. Consequently, much of the excavation must be carried out by hand especially if the tunnel being dug is relatively small such as, for example, interconnecting service tunnels or cross-tunnels extending perpendicularly to main running tunnels where a conventional boom does not have the required degree of articulation to enable it to access such spaces. Furthermore, it will be appreciated that the precise positioning of the boom is of particular importance if it is being used to position and locate heavy tunnel lining elements against the wall of a tunnel under construction. However, conventional boom assemblies just do not have the required degree of articulation to enable them to be used for such a task without further complex machinery to assist them.

In addition to the construction of tunnels, at present there exists no effective boom assembly with the required degree of articulation that can be used for cleaning the inside of the tunnel walls without damaging cables and other services that may be suspended or otherwise connected to those walls.

It is an object of the present invention to overcome or substantially alleviate the problems described above.

According to the present invention, there is provided a boom assembly comprising a primary boom member having one end attachable to a vehicle and a secondary boom member pivotally attached to the free end of the primary boom member for rotation of the secondary boom member about a first axis relative to the primary boom member and, a swivel mechanism configured to enable the secondary boom member to be rotated relative to the primary boom member about a second axis of rotation independently to rotation of the secondary boom member relative to the primary boom member about the first axis of rotation.

In a preferred embodiment, the first and second axes of rotation are oriented substantially at right angles to each other.

Preferably, the secondary boom member comprises a secondary boom attachment portion and a main body portion, the swivel mechanism rotatably coupling the secondary boom attachment portion to the main body portion for rotation of the main body portion relative to the attachment portion about said second axis of rotation.

The secondary boom attachment portion, in a preferred embodiment, pivotally couples the secondary boom member to the primary boom member for rotation of the secondary boom member relative to the primary boom member about the first axis.

The swivel mechanism advantageously includes a rotary actuator.

The rotary actuator preferably has a first fixed portion attached to the secondary boom attachment portion and, a second portion rotatable relative to the fixed portion in response to the application of hydraulic fluid pressure thereto, attached to the main body portion for rotating the main body portion about said second axis.

In one embodiment, the swivel mechanism includes a bearing plate attached to the secondary boom attachment portion and, a rotary adapter plate attached to the main body portion, the bearing and adapter plates facing, and being spaced, from each other by the rotary actuator.

The bearing plate is conveniently attached to the first fixed portion of the rotary actuator and the rotary adapter plate is attached to the second portion rotatable relative to the first fixed portion.

In a preferred embodiment, the swivel mechanism includes a bearing housing mounted to the second portion of the rotary actuator so that the bearing housing rotates together with the main body portion about said second axis.

Ideally, the bearing housing is dished to form an annular recess that faces the bearing plate of the secondary boom attachment portion.

A dividing wall may upstand from the bearing plate towards the bearing housing to divide the annular recess into radially inner and radially outer bearing compartments.

Preferably, a radial bearing is received in the inner bearing compartment between the bearing housing and the bearing plate.

Preferably, a taper roller bearing is received in the outer bearing compartment between the bearing housing and the bearing plate.

The radial bearing and taper roller bearing are advantageously located on opposite sides of the dividing wall.

The radial bearing is preferably disposed within the circumference of the taper roller bearing.

The annular recess in the bearing housing is preferably bounded by an outer wall that extends towards the bearing plate.

The outer wall conveniently terminates short of the bearing plate to leave a gap therebetween. A skirt may depend from the outer wall and locate in a slot formed in the bearing plate to close the gap.

The skirt may be attached to the bearing housing with a skirt-retaining strap.

The rotary adapter plate is preferably spaced from the bearing housing by the rotary actuator.

In one embodiment, a tubular housing extends between the bearing housing and the rotary adapter plate over the rotary actuator.

Preferably, the tubular housing is received in corresponding slots formed in the rotary adaptor plate and the bearing housing, respectively.

Advantageously, the rotary adapter plate and bearing plate are directly coupled together by a fastening member extending through the rotary actuator and the bearing housing.

The fastening member may comprise a bolt extending through the rotary adapter plate and the bearing plate and a nut threadingly engaged therewith to couple the bearing plate and rotary adapter plate together.

In a preferred embodiment, a thrust bearing is disposed between the bolt and the rotary adapter plate to allow rotation of the plate relative to the bolt.

According to the invention, there is also provided a vehicle fitted with a boom assembly according to the invention.

An embodiment of the invention will now be described, by way of example only, with reference to the accompanying drawings, in which.

Figure 1:
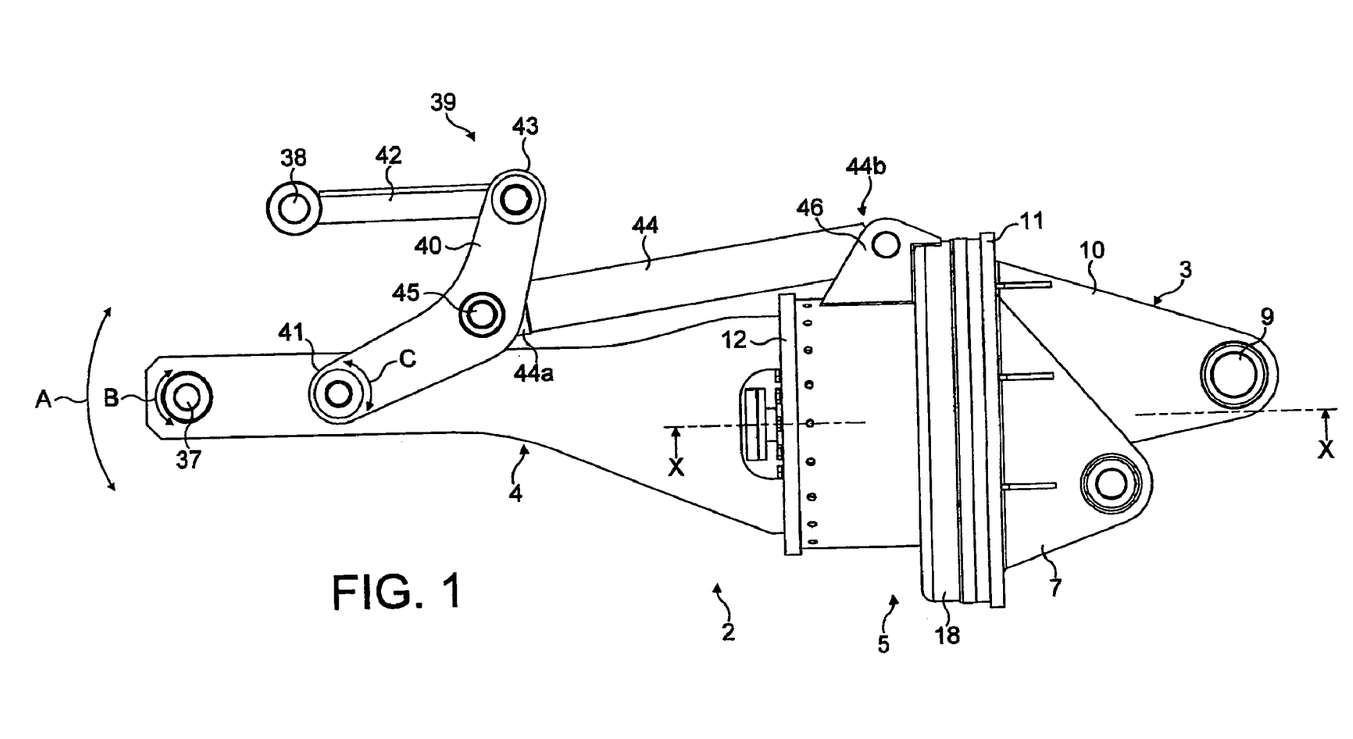
FIG. 1 is a side elevation of the secondary boom member according to an embodiment of the invention.

Referring now to the drawings, there is shown in FIG. 1 a side elevation of a secondary boom member 2 that forms part of a boom assembly and includes a secondary boom attachment portion 3 and a main body portion 4 attached to each other via a swivel mechanism 5 to allow the main body portion 4 to rotate relative to the secondary boom attachment portion 3 about an axis indicated by the line marked "X" in the drawing.

Figure 6:
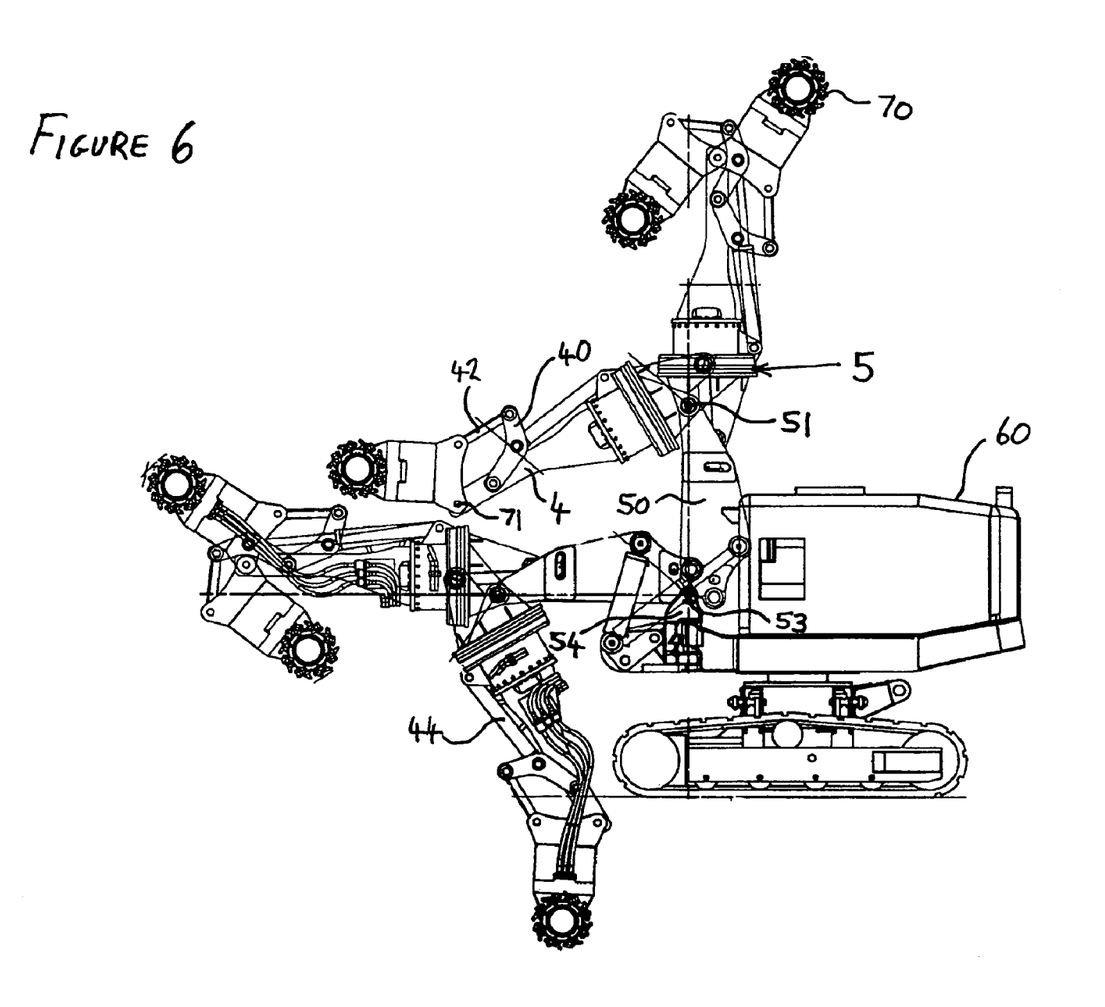
FIG. 6 is a side view of the boom assembly and vehicle of FIGS. 4 and 5 showing various different positions of the assembly relative to the vehicle.

The secondary boom attachment portion 3 is pivotally connected to a primary boom member 50 (see FIGS. 4 and 6) using a pin 51 inserted through aperture 6 in a primary boom member attachment plate 7 that locates in a corresponding aperture in the primary boom member 50 for rotation of the secondary boom member 2 relative to the primary boom member 50 about an axis 8 extending through the pin 51 (at right angles to the page, as shown in FIG. 1) to move the secondary boom member 2 in a vertical direction as indicated by arrows marked "A" and in response to actuation of a hydraulic cylinder 52 (see FIG. 4) one end of which is mounted to the primary boom member 50 and the other end connected to an aperture 9 in a secondary boom cylinder attachment plate 10. FIG. 6 shows various pivoted positions of the primary boom member 50 relative to the secondary boom member 2.

The free end of the primary boom member 50 may be pivotally attached to a vehicle 60 (see FIGS. 4-6) on which is mounted all the hydraulic equipment for driving the boom assembly and for powering the vehicle 60. The primary boom member 50 is attached to the vehicle 60 by a pivot pin 53 which extends through two parallel vertical vehicle mounting plates 54 extending upwardly from a front platform 61 at the front of the vehicle 60. The end of the primary boom member 50 remote from the secondary boom member 2 locates between the vehicle mounting plates 54 and has an aperture therethrough (not shown) to receive the pivot pin 53.

Figure 4:
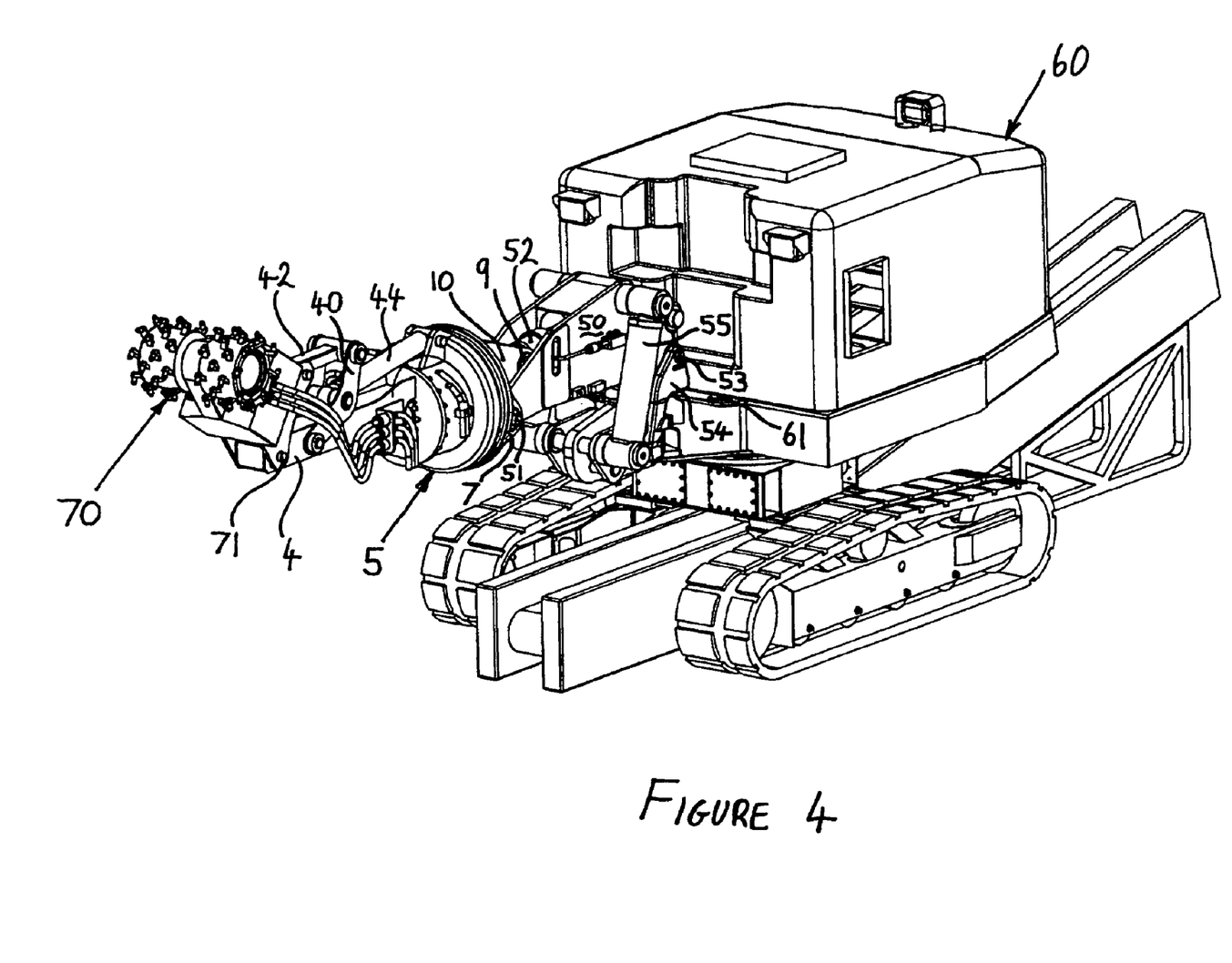
FIG. 4 is a perspective view of the boom assembly of the invention attached to a vehicle and with a drilling head on the other end of the boom assembly.

The primary boom member 50 is supported and pivotally moveable by two hydraulic pistons 55, one either side of the primary boom member 50.

Figure 5:
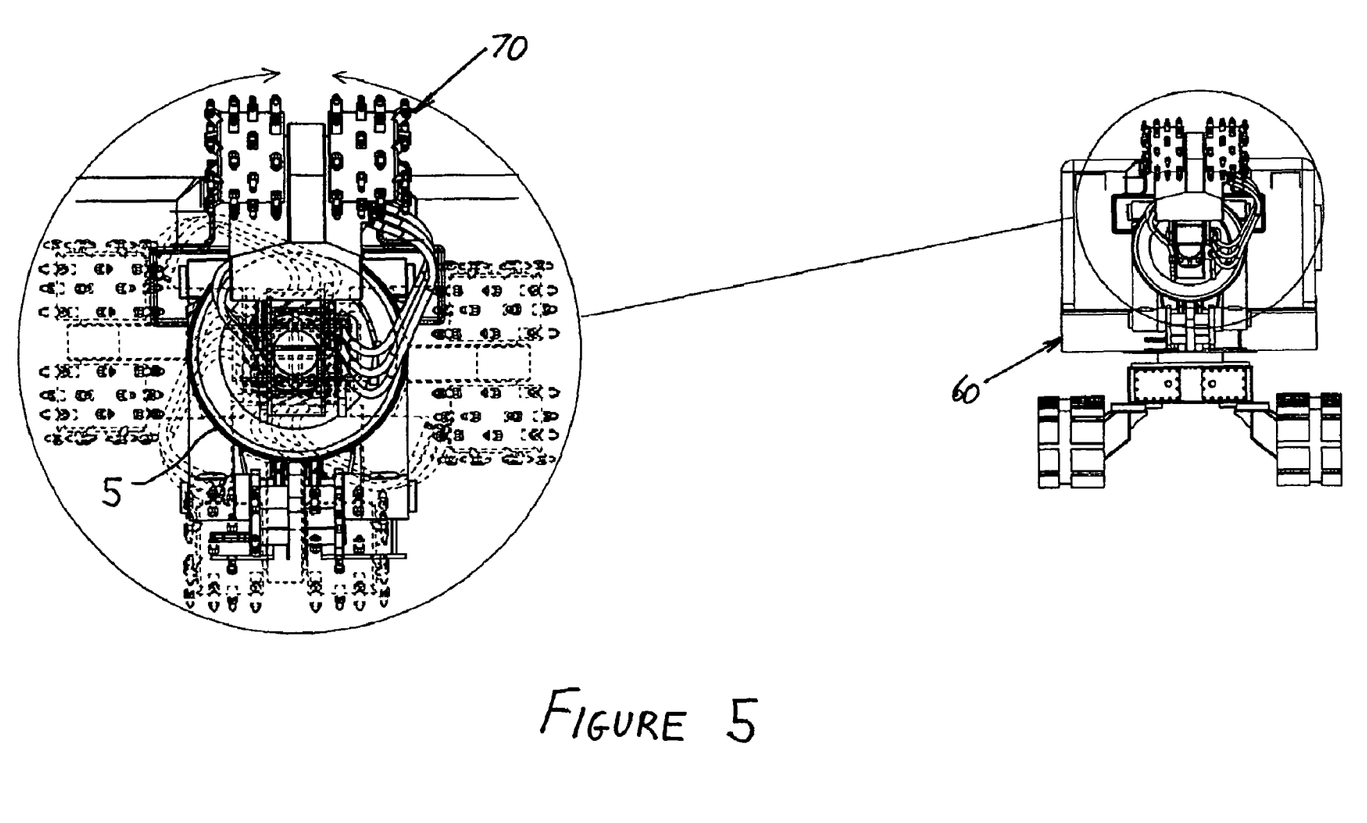
FIG. 5 is a front view of the boom assembly and vehicle of FIG. 4 showing various possible rotational positions of the assembly.

The swivel mechanism 5 comprises a fixed bearing plate 11 from which the primary boom member attachment plate 7 and the secondary boom cylinder attachment plate 10 extend and a rotary adapter plate 12 is attached to the main body portion 4. The fixed bearing plate 11 and rotary adapter plate 12 are parallel but spaced from each other by a conventional rotary actuator 13 (see FIGS. 2 and 3) extending between them for converting fluid power into rotary motion. The rotary actuator 13 has first fixed portion 14 to which the bearing plate 11 is mounted using a first set of bolts 15 and, a second portion 16, that rotates relative to the first portion 14 in response to the application of hydraulic pressure, to which the rotary adapter plate 12 is mounted using a second set of bolts 17. Therefore, it will be appreciated that the rotary actuator 13 couples the main body portion 4 and the secondary boom member attachment portion 3 together so that the main body portion 4 is rotatable relative to the secondary boom member attachment portion 3 about the axis marked "X" in FIG. 1. These degrees of rotation are shown in FIG. 5 which shows a first position of the main body portion 4 of the secondary boom member 2, with a drilling head 70 attached thereto, in a first position in solid lines, and three other positions in dashed lines.

Figure 2:
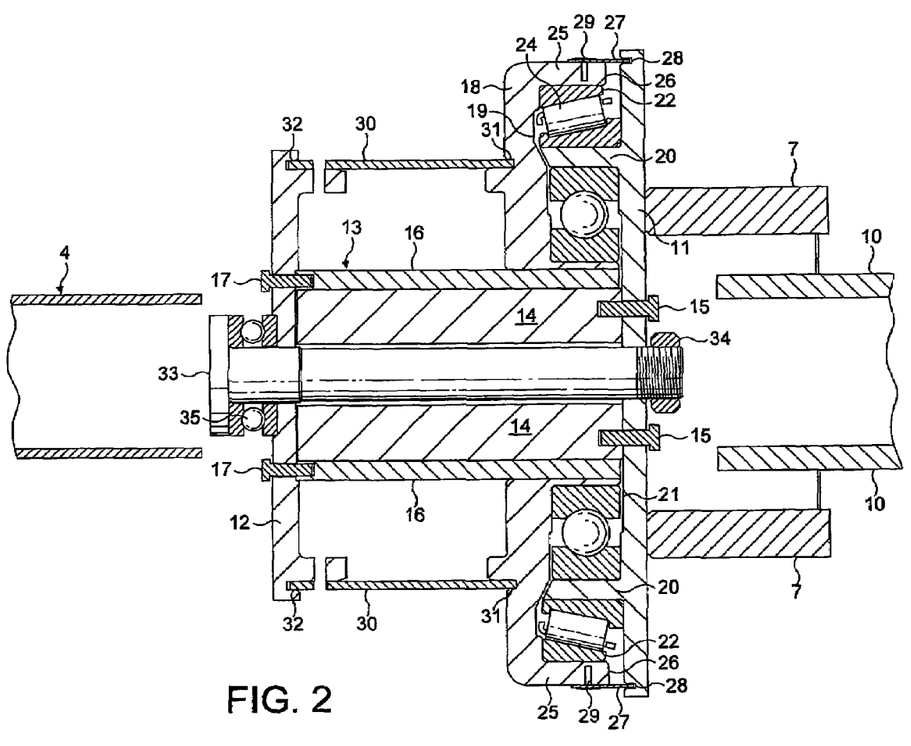
FIG. 2 is an enlarged cross-sectional side view of the swivel mechanism shown in the side elevation of FIG. 1.
Figure 3:
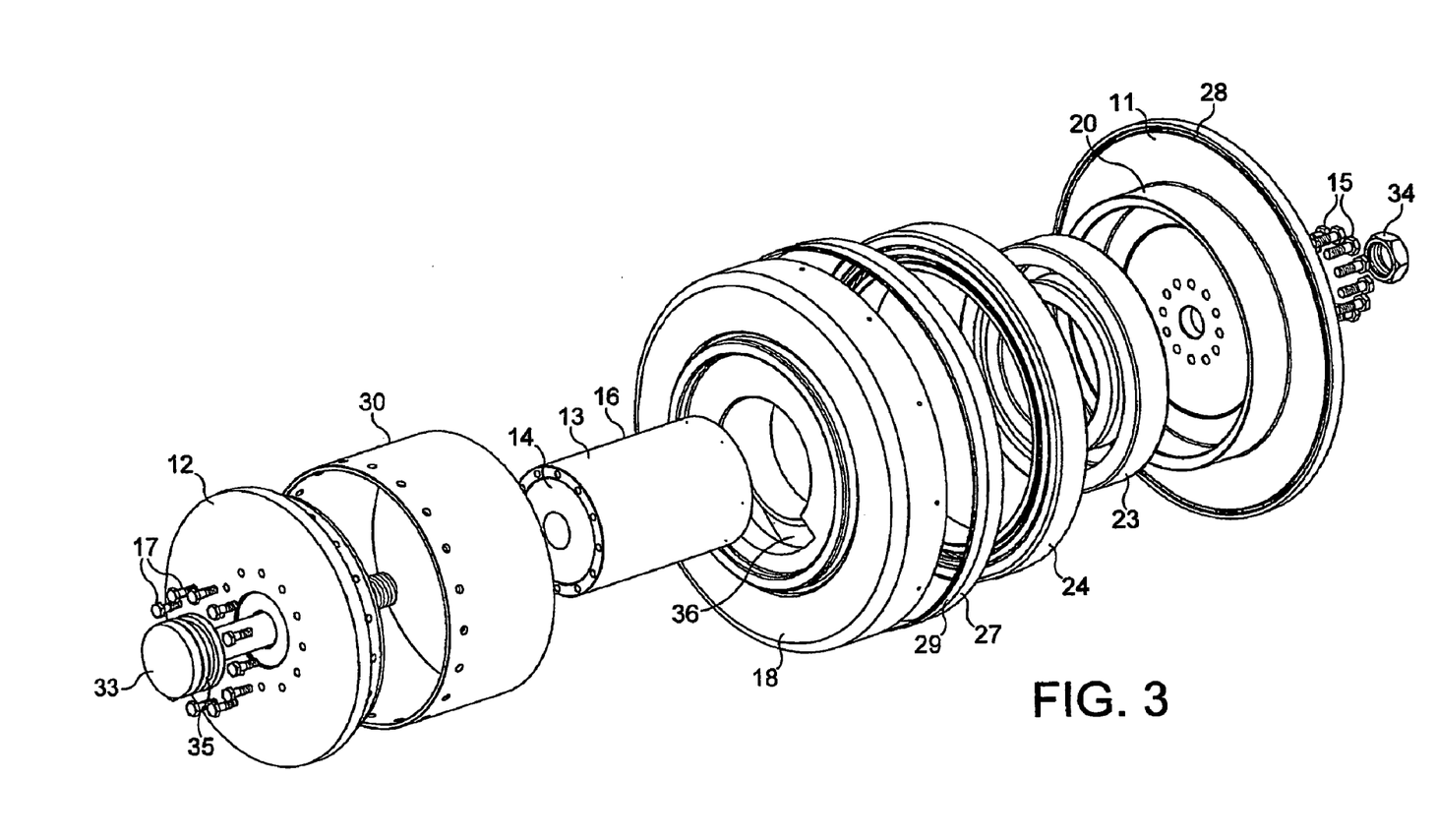
FIG. 3 is an exploded perspective view of the swivel mechanism shown in FIGS. 1 and 2.

A bearing housing 18 is mounted on the second rotatable portion 16 of the rotary actuator 13 between the bearing plate 11 and the rotary adapter plate 12. The bearing housing 18 is rotatable together with the main body portion 4 of the secondary boom member 2 and comprises an annular plate which is dished to form a annular recess 19 which faces the bearing plate 11. The bearing plate 11 includes an upstanding cylindrical dividing wall 20 that extends into the annular recess 19 of the bearing housing 18 to divide the recess 19 into a radially inner bearing compartment 21 and a radially outer bearing compartment 22.

A radial bearing 23 is located in the radially inner bearing compartment to rotatably support the bearing housing 18 relative to the bearing plate 11. Similarly, a taper roller bearing 24 is located in the radially outer bearing compartment 22. The inner radial bearing 23 is surrounded by the outer taper roller bearing 24 and the two bearings 23, 24 are separated from each other by the dividing wall 20. The bearing housing 18 rotates, together with the rotary actuator 13, relative to the bearing plate 11 via the taper roller bearing 24 and the radial bearing 23 located between them. The radial bearing 23 and the taper roller bearing 24 transfers load from the main body portion 4 to the secondary boom member attachment portion 3 without subjecting the rotary actuator 13 itself to such loads. It will of course be understood that the swivel mechanism 5 must be able to withstand a significant load especially if the boom assembly is being used to excavate tunnels or drill through rock.

The outer wall 25 of the bearing housing 18 which forms the annular recess 22 stops short of the bearing plate 11 leaving a gap 26 between the bearing housing 18 and the bearing plate 11. A skirt or band 27 extends from the wall 25 and locates in a slot 28 formed in the bearing plate 11 to close the gap 26 and prevent the ingress of dirt into the swivel mechanism 27. The skirt 27 is attached to the outside of the wall by a skirt retaining member 29.

The rotary adapter plate 12 is spaced from the bearing housing 18 by the rotary actuator 13. A tubular cover plate 30 extends between the bearing housing 18 and the rotary adapter plate 12 over the rotary actuator 13 and locates in corresponding slots 31, 32 in the bearing housing 18 and rotary adapter plate 12 at each end.

To provide additional support for the rotary actuator 13, a bolt 33 extends through the rotary adapter plate 12, the rotary actuator 13, the bearing housing 18 and the bearing plate 11 and is retained in position by a nut 34 threadingly connected thereto. A thrust bearing 35 is disposed between the bolt 33 and the rotary adapter plate 12 to allow the rotary adapter plate 12 to rotate relative to the bolt 33.

As can be seen from the exploded perspective view of FIG. 3, the bearing housing 18 includes a recess 36. This recess 36 provides a space to receive the fluid inlet (not shown) mounted to the rotary actuator 13. Hydraulic fluid supply hoses (not shown) extend from the fluid inlet through the swivel mechanism 5 for connection to a hydraulic fluid supply system mounted on the vehicle.

A device such as a bucket or drilling head 70 (see FIGS. 4-6) may be pivotally mounted to the end of the main body portion 4 of the secondary boom member 2 using a pin 71 (see FIGS. 1 and 6) that extends through an aperture 37 adjacent to the free end of the main body portion 4. The device is able to rotate about an axis extending through the pin 71 in the direction indicated by arrow marked "B" in FIG. 1. To rotate the device about this axis, there is a second attachment point 38 to a croud arm assembly 39. The croud arm assembly 39 comprises a lever 40 having a first end 41 pivotally attached to the main body portion 4 adjacent to the point of attachment of the device attached directly to the main body portion 4 and, a device attachment arm 42 pivotally mounted to the other end of the lever 40. The device is pivotally mounted to the free end of the device attachment arm 42. The lever 40 rotates relative to the main body portion 4 in the direction indicated by arrow "C" in FIG. 1, in response to extension and contraction of a hydraulic cylinder 44 having one end 44a pivotally mounted to the lever 40 at a point between the ends 41, 43 thereof and, the other end 44b being mounted to the main body member 4 or part of the swivel mechanism 5 that rotates together with the main body member 4. In FIG. 1, the end of the cylinder 44 is shown as being attached to a mounting flange 46 attached to the cover plate 30 and bearing housing 18 forming part of the swivel assembly 5.

It will be appreciated from the foregoing that the boom assembly of the present invention is significantly more flexible and versatile than a conventional boom assembly because the swivel mechanism 5 enables the secondary boom member 2 to rotate relative to the primary boom member about two different axes substantially at right angles to each other. This enables the device mounted to the free end of the secondary boom member to be positioned in any desired location, even in confined spaces. Furthermore, the arrangement and construction of the swivel mechanism and bearing assemblies 23, 24 and 35 thereof described above ensure that all load transferred from the main body portion 4 in use, both in the direction of the axis of rotation "X" of the swivel mechanism 5 and perpendicular to the axis "X" of rotation, is taken by said bearings, and none of the load is taken by the rotary actuator 13 itself. This protects the actuator 13 from damage through use, and differs from conventional geared machinery in which a portion of the load can be taken by the gears themselves, resulting in wear of the gear mechanisms, leading to failure thereof, or a need for frequent maintenance or replacement of the mechanism.

In use, the hydraulic hoses that supply hydraulic fluid under pressure to the rotary actuator 13 and the various hydraulic cylinders/pistons 44, 52, 55 extend from the main body of the vehicle 60 to each unit and are disposed on the boom assembly in such a way so as to allow the boom assembly to move in all of the described and illustrated degrees of motion without snagging, pinching or stretching them. It has been found that the optimum routing for the hydraulic hoses from the vehicle 60 to the primary boom member 50 is for them to be disposed between the vertical vehicle mounting plates 54, in the space between the pivot pin 53 and the front platform 61 from which the vehicle mounting plates upstand. From there, the hydraulic hoses pass along the underside of the primary boom member 50 until they are required to extend in different directions depending on which respective hydraulic drive unit each hose is connected to.

Many modifications and variations of the invention falling within the terms of the following claims will be apparent to those skilled in the art and the foregoing description should be regarded as a description of the preferred embodiments only.

The invention claimed is:

1. A boom assembly comprising:
   a primary boom member having one end attachable to a vehicle;
   a secondary boom member pivotally attached to the free end of the primary boom member for rotation of the secondary boom member about a first axis relative to the primary boom member, the secondary boom member including a secondary boom attachment portion and a main body portion; and
   a swivel mechanism configured to enable the secondary boom member to be rotated relative to the primary boom member about a second axis of rotation independently to rotation of the secondary boom member relative to the primary boom member about the first axis of rotation, the swivel mechanism including:
   a rotary actuator that has a first fixed portion attached to the secondary boom attachment portion and a second portion rotatable relative to the fixed portion in response to the application of hydraulic fluid pressure thereto, the second portion being attached to the main body portion for rotating the main body portion about the second axis;
   a bearing plate attached to the secondary boom attachment portion and a rotary adapter plate attached to the main body portion, the bearing and adapter plates facing and being spaced from each other by the rotary actuator; and
   a bearing housing mounted to the second portion of the rotary actuator so that the bearing housing rotates together with the main body portion about the second axis, the bearing housing being dished to form an annular recess that faces the bearing plate of the secondary boom attachment portion, wherein a dividing wall upstands from the bearing plate towards the bearing housing to divide the annular recess into radially inner and radially outer bearing compartments.

2. A boom assembly according to claim 1, wherein the first and second axes of rotation are oriented substantially at right angles to each other.

3. A boom assembly according to claim 1, wherein the secondary boom attachment portion pivotally couples the secondary boom member to the primary boom member for rotation of the secondary boom member relative to the primary boom member about the first axis.

4. A boom assembly according to claim 1, wherein the bearing plate is attached to the first fixed portion of the rotary actuator and the rotary adapter plate is attached to the second portion rotatable relative to the first fixed portion.

5. A boom assembly according to claim 1, wherein a radial bearing is received in the inner bearing compartment between the bearing housing and the bearing plate.

6. A boom assembly according to claim 1, wherein a taper roller bearing is received in the outer bearing compartment between the bearing housing and the bearing plate.

7. A boom assembly according to claim 6, wherein the radial bearing and taper roller bearing are located on opposite sides of the dividing wall.

8. A boom assembly according to claim 6, wherein the radial bearing is disposed within the circumference of the taper rolling bearing.

9. A boom assembly according to claim 1, wherein the annular recess in the bearing housing is bounded by an outer wall that extends towards the bearing plate.

10. A boom assembly according to claim 9, wherein the outer wall terminates short of the bearing plate to leave a gap therebetween.

11. A boom assembly according to claim 10, wherein a skirt depends from the outer wall and locates in a slot formed in the bearing plate to close the gap.

12. A boom assembly according to claim 11, comprising a skirt-retaining strap to attach the skirt to the bearing housing.

13. A boom assembly according to claim 1, wherein the rotary adapter plate is spaced from the bearing housing by the rotary actuator.

14. A boom assembly according to claim 13, wherein a tubular housing extends between the bearing housing and the rotary adapter plate over the rotary actuator.

15. A boom assembly according to claim 14, wherein the tubular housing is received in corresponding slots formed in the rotary adaptor plate and the bearing housing, respectively.

16. A boom assembly according to claim 15, wherein the rotary adapter plate and bearing plate are directly coupled together by a fastening member extending through the rotary actuator and the bearing housing.

17. A boom assembly according to claim 16, wherein the fastening member comprises a bolt extending through the rotary adapter plate and the bearing plate and a nut threadingly engaged therewith to couple the bearing plate and rotary adapter plate together.

18. A boom assembly according to claim 17, wherein a thrust bearing is disposed between the bolt and the rotary adapter plate to allow rotation of the plate relative to the bolt.

19. A vehicle fitted with a boom assembly according to claim 1.

* * * * *